United States Patent Office 3,374,767
Patented Mar. 26, 1968

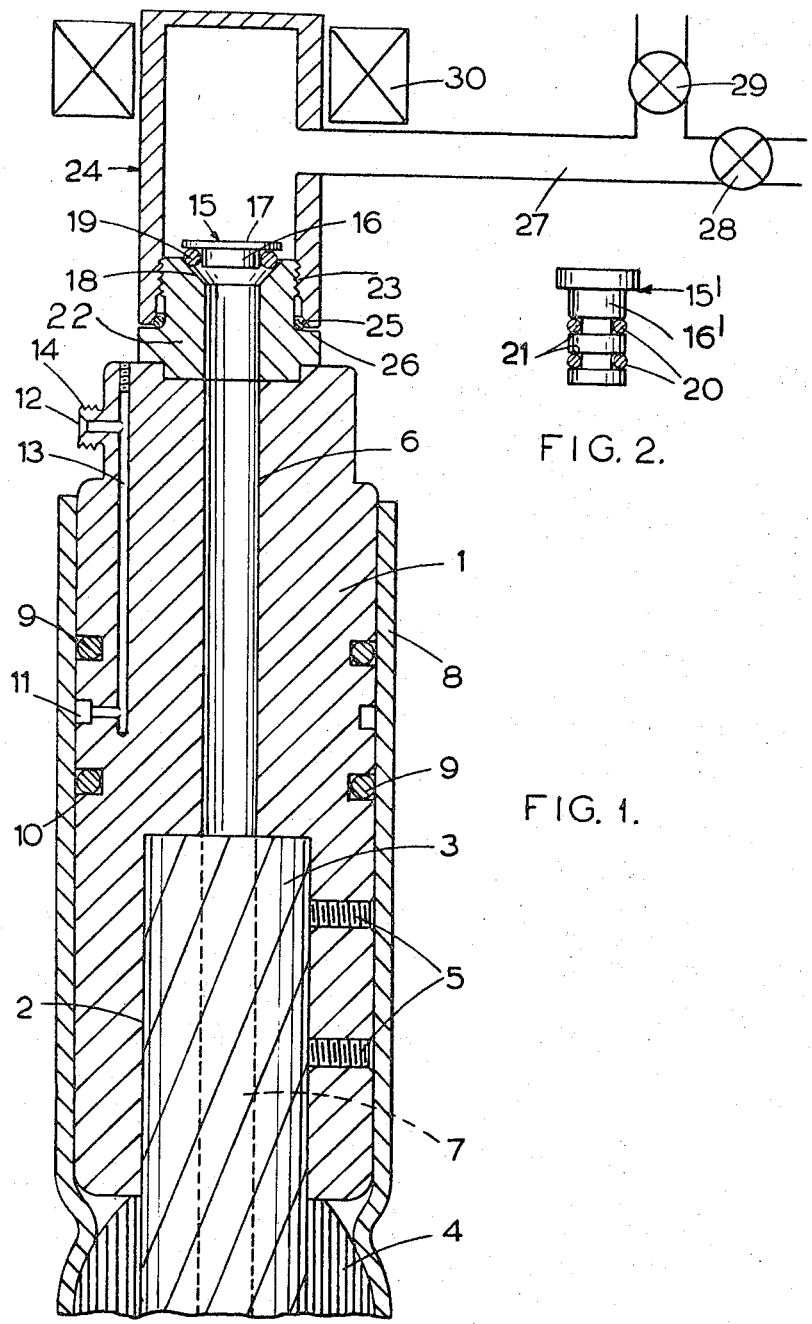

3,374,767
MEANS TO IMPREGNATE A HOLLOW CABLE CORE
John Alfred Baskwell, Winchester, England, assignor to Pirelli General Cable Works Limited, London, England, a company of Great Britain
Filed June 4, 1965, Ser. No. 461,409
Claims priority, application Great Britain, July 27, 1964, 29,876/64
9 Claims. (Cl. 118—408)

ABSTRACT OF THE DISCLOSURE

A tubular end plug utilized in impregnation of a sheathed conductor-cable and wherein one end includes means for sealing engagement with said cable and the other end includes (a) means adapted to be connected to a supply if impregnant and (b) magnetically responsive closure means whereby the cable and tubular plug may be sealed off with respect to the connecting means.

---

The invention relates to apparatus for the manufacture of oil-filled electric cables, and more specifically to such manufacture by the post-impregnation method.

In this method, the cable core, comprising one or more conductors and surrounding insulation, is heated under vacuum in a tank so as thoroughly to dry the insluation and free it from air. Before the insulation is impregnated with a suitable insulating fluid, herein referred to as oil, an impervious sheath, normally of lead or aluminum, is applied to the core, which is drawn from the tank to a sheathing station for this purpose, the vacuum being maintained from the tank to the station and thus within the core while the sheath is applied. It will be appreciated that some means must be provided for sealing at least the leading end of the sheathed cable core as this emerges from the sheathing station, and this sealing means must allow for subsequent introduction of impregnating oil. British Patent No. 908,036 envisages the use of a plug provided with a valve, and U.S. application Ser. No. 307,486 discloses a suitable plug construction. British Patent No. 1,059,217 relates to a sealing plug having an element which can be readily ruptured when access to the interior of the sheathed core is required. The present invention has as its object the provision of a further form of sealing apparatus.

The invention accordingly provides apparatus for use in the manufacture of an electric cable comprising a sheathed core impregnated with insulating fluid, the apparatus comprising an end plug for sealing an end of the sheathed cable core when evacuated prior to impregnation, the plug having a passage for communication between the core and the outside, and a sealing member of magnetic material for sealing the passage in the plug, the member being magnetically movable to open the passage to allow impregnation of the core with the insulating fluid.

The means for creating the magnetic field necessary to move the sealing member is suitably provided on a casing or fitting capable of forming with the end of the plug a chamber which is first evacuated to relieve the pressure difference acting on the two sides of the cap and by way of which oil can be introduced into the cable core through the passage uncovered by the movement of the cap. The casing it suitably a tube having a solenoid coil around one end into which the cap can be withdrawn on passage of a current through the coil. The invention also provides a method of manufacturing an electric cable by means of such apparatus.

By way of illustration, an end plug embodying the invention is described below with reference to the accompanying drawing.

In the drawing:
FIGURE 1 is a cross section through a cable end having the end plug thereon, means for opening the cable end, for applying vacuum, and for supplying oil being indicated diagrammatically; and
FIGURE 2 is a side view of a cap which can be used as an alternative to that shown in FIGURE 1.

The end plug shown in FIGURE 1 of the drawing comprises a generally cylindrical body 1 with an axial bore. An end portion 2 of the bore is wide enough to receive a short length of a conductor 3 of a cable from which insulation 4 has been removed. Allen screws 5 projecting through tapped holes in the plug wall are provided to engage the conductor 3 and secure it to the plug. The portion 6 of the bore extending from the conductor end to the outer end of the body 1, that is, the end remote from the cable, is of lesser diameter than the portion 2 and communicates with an oil duct 7 in the cable.

The portion of the body 1 around the bore portion 6 of lesser diameter is provided externally with means for sealing to a sheath of the cable, which is applied over the insulation 4 and over the body 1. The sealing means comprises O-rings 9 of resilient material received in circumferential grooves 10 but projecting somewhat above the general surface of the body 1 so that their resilience ensures a good seal to the sheath.

Between the O-rings 9 is provided a guard ring or groove 11 which communicates with an aperture 12 near the outer end of the body by way of a bore 13 extending parallel to the main bore of the plug. A vacuum source can be connected to a fitting 14 at the aperture 12 to withdraw any air leaking past the outer O-ring. The body 1 is slightly reduced in diameter at the outer end so that the fitting does not project outside the general form of the plug.

At the outer end of the body 1 the bore 6 is stopped by a cap 15, suitably of steel. The cap has a short stem 16 and a head 17 of larger diameter constituted as an end flange of the stem. The bore 6 has an outwardly flared portion 18 at its extreme end and a resilient ring 19 effects a seal in the space between the cylindrical surface of the stem 16, the adjacent radial surface of the head 17, and the flared surface 18 of the bore. The pressure difference between the atmosphere and the evacuated core tends to retain the cap in place.

In a modified cap 15', shown in FIGURE 2, the stem 16' is long enough to accommodate a sealing or packing means, comprising a pair of resilient O-rings 20 in grooves 21 on the stem. In this arrangement the stem is received in the bore 6, which need not be flared.

The extreme end portion 22 of the body 1 is of reduced diameter and externally threaded at 23; the end portion is a separate member secured, as by welding, to the main body 1. A tubular casing or fitting 24 having a closed end and an open end can be screwed at its open end onto this end portion by means for internal threads engaging with the threads at 23. A sealing ring 25 is compressed between the open end of the casing and an annular face 26 provided on the end portion, so that a vacuum-tight chamber is defined by the casing interior and the steel cap.

The casing has a side tube 27 by which its interior can be connected to a vacuum pump or to a source of impregnating oil through respective valves 28, 29. A solenoid 30 surrounds the outer casing end and it will be appreciated that after the casing, together with its side tube and connections, have been evacuated to remove the pressure difference acting on the cap, current can be passed through the solenoid and the steel cap is magnetically withdrawn from the bore in the end plug to within the solenoid at the outer end of the casing. The cable interior is thus put in communication with that of the casing and so with the source of oil, without any danger that air or moisture will enter the insulation.

As the cap has to be in place during the drying operation, that is, before the existence of the pressure difference mentioned above, means must be provided for securing it to the plug during this operation. Conveniently a holding nut engaging the external thread at the extreme plug end is employed for this purpose.

In practice, the post-impregnation method can follow the general lines disclosed in application Ser. No. 307,486. In brief, a plug having its bore stopped by a steel cap or held in place by a holding nut is secured to at least one, and preferably to each, end of a cable core conductor. The core is placed in the tank and the drying step is carried out. A tube connecting the tank mouth to the sheathing station is then evacuated and the evacuated core is drawn through the sheathing apparatus, the vacuum in the core being maintained. The sheath 8 applied over the insulation 4 of the core seals to both end plugs, so that a sealed evacuated system is obtained comprising the sheathed core and the end plugs. Casings as described are fitted on the end plugs in place of the holding nuts and both casing are evacuated. Current is next passed through the solenoid coils to withdraw the caps. Oil is then introduced into the sheathed core through one of the casings, the other being still connected to a vacuum pump. When oil appears at this outer casing impregnation has been completed.

What I claim and desire to secure by Letters Patent of the United States is:

1. A plug for sealing the end of a sheathed cable core comprised of conductor and insulator, comprising:
    a body, said body having a passage extending therethrough, a portion of said passage at one end having a diameter sufficient to receive a length of the conductor, a first sealing means of magnetic material engaging said passage at one end for effecting closing thereof, the sealing means being magnetically movable to open said passage, and a second sealing means on the outer surface of the body for sealing a portion of the body to the interior of the sheath, whereby upon placing the body in the sheath, the conductor in the portion of the passage at said one end, and magnetically opening the first sealing means, an impregnating fluid may be introduced into the sheathed core through the plug.

2. The plug as claimed in claim 1 wherein the body is generally cylindrical and has a diameter substantially identical to the body of the core.

3. The plug as claimed in claim 1 wherein the second sealing means comprises: two spaced grooves in the body outer surface, and resilient O-rings positioned in said grooves, said O-rings engaging the interior of the sheath upon placing the body in the sheath.

4. The plug as claimed in claim 3 and further comprising a further groove positioned between said two spaced grooves, a passage means connecting said groove to the exterior portion of the body not positioned in the sheath whereby said groove may be connected to a vacuum source.

5. The plug as claimed in claim 1 wherein the other end of said passage is outwardly flared and said first sealing means comprises: a head portion, a stem portion extending from said head portion, and a resilient O-ring around the stem portion, the passage being closed by engagement of the O-ring with the stem portion, the head portion and the flared portion of the passage.

6. The plug as claimed in claim 1 wherein said first sealing means comprises: a head portion, a stem portion connected to the head portion and extending in said other end of the passage, at least one groove in said stem portion, a resilient O-ring in said groove whereby the O-ring engages the passage wall to close the passage.

7. The plug as claimed in claim 1 and further comprising: a casing releasably secured to said body at said other end whereby the interior of the casing is in fluid flow communication with the passage upon opening the first sealing means, and an electrical coil connected to said casing whereby energization of said coil moves the first sealing means to open said passage.

8. The plug as claimed in claim 7 and further comprising means connected to the casing for connecting the interior of the casing to a vacuum source and a source of impregnating fluid.

9. The plug as claimed in claim 1 and further comprising: a holding means connected to the plug at said one end for maintaining the first sealing means in engagement with said passage.

References Cited

UNITED STATES PATENTS

| | | | |
|---|---|---|---|
| 982,860 | 1/1911 | Peelle | 53—109 X |
| 1,294,820 | 2/1914 | Middleton | 53—109 X |
| 1,992,557 | 2/1953 | Tone et al. | 53—109 |
| 2,525,662 | 10/1950 | Freeman | 18—6 |
| 2,795,246 | 6/1957 | Kuebler | 141—66 |
| 3,144,035 | 8/1967 | Hablanian et al. | 277—59 X |

MORRIS KAPLAN, *Primary Examiner.*